(12) United States Patent
Turnbull et al.

(10) Patent No.: US 7,215,318 B2
(45) Date of Patent: May 8, 2007

(54) ELECTROCHROMIC ELEMENT DRIVE CONTROL CIRCUIT

(75) Inventors: Robert R. Turnbull, Holland, MI (US); David J. Schmidt, Holland, MI (US)

(73) Assignee: Gentex Corporation, Zeeland, MI (US)

( * ) Notice: Subject to any disclaimer, the term of this patent is extended or adjusted under 35 U.S.C. 154(b) by 168 days.

(21) Appl. No.: 10/178,480

(22) Filed: Jun. 24, 2002

(65) Prior Publication Data

US 2003/0234752 A1 Dec. 25, 2003

(51) Int. Cl.
G09G 3/38 (2006.01)
G09G 5/00 (2006.01)
G09G 3/19 (2006.01)
G02B 27/00 (2006.01)

(52) U.S. Cl. .................. 345/105; 345/49; 345/212; 359/601

(58) Field of Classification Search .............. 345/1.1, 345/2.1, 49, 105, 240, 207, 208, 211–213; 359/546, 548, 601–603
See application file for complete search history.

(56) References Cited

U.S. PATENT DOCUMENTS

| 4,902,108 | A | 2/1990 | Byker | 350/357 |
| 5,204,778 | A | 4/1993 | Bechtel | 359/604 |
| 5,451,822 | A * | 9/1995 | Bechtel et al. | 307/9.1 |
| 5,581,406 | A * | 12/1996 | Kobayashi et al. | 359/604 |
| 5,747,964 | A | 5/1998 | Turnbull | 320/2 |
| 5,956,012 | A * | 9/1999 | Turnbull et al. | 345/105 |
| 6,056,410 | A | 5/2000 | Hoekstra et al. | 359/603 |
| 6,084,700 | A | 7/2000 | Knapp et al. | 359/265 |
| 6,089,721 | A | 7/2000 | Schierbeek | 359/603 |
| 6,170,956 | B1 | 1/2001 | Rumsey et al. | 359/839 |
| 6,247,819 | B1 | 6/2001 | Turnbull et al. | 359/601 |
| 6,355,920 | B1 | 3/2002 | Schofield et al. | 250/206 |
| 6,359,274 | B1 | 3/2002 | Nixon et al. | 250/214 |
| 6,386,713 | B1 | 5/2002 | Turnbull et al. | 359/604 |
| 6,406,152 | B1 * | 6/2002 | Hoekstra et al. | 359/603 |

* cited by examiner

Primary Examiner—Henry N. Tran
(74) Attorney, Agent, or Firm—Price, Heneveld, Cooper, DeWitt, Litton (57) ABSTRACT

A drive control circuit for controlling an electrochromic element is substantially integrated into an integrated circuit, with the exception of resistive elements for dissipating heat away from the integrated circuit. The drive control circuit includes a current regulator for generating a select one of at least two discrete amounts of current to drive the electrochromic element. Further, a control system individually controls a plurality of electrochromic elements and includes shunts coupled in parallel with the individual electrochromic elements. The control system controls the ratio of the reflectance of the individual electrochromic elements as a function of sensed glare.

60 Claims, 9 Drawing Sheets

ELECTROCHROMIC ELEMENT DRIVE CONTROL CIRCUIT

BACKGROUND OF THE INVENTION

The present invention generally relates to electrochromic elements, such as electrochromic mirrors, and, more particularly relates to a drive control circuit for driving one or more electrochromic elements.

Electrochromic elements (EC) are increasingly employed for use in electrochromic mirrors, window systems, and other electronic glare control applications, particularly for use on automotive vehicles. In automotive applications, an electrochromic element is commonly employed in the inside rearview mirror for use in varying the reflectance of the mirror to automatically control glare from external light sources. In addition, it is known to employ a plurality of electrochromic elements in a vehicle, including electrochromic elements in the inside rearview mirror and one or more outside rearview mirrors. The reflectance of an electrochromic element generally is a function of the voltage applied to the electrochromic element as, for example, as described in U.S. Pat. No. 4,902,108, assigned to the assignee of the present invention. The aforementioned U.S. patent disclosure is hereby incorporated herein by reference.

Automotive electrochromic mirror systems typically employ an electronic drive circuit for applying power to the electrochromic element(s) from a vehicle battery (e.g., 12-volt DC supply). Each electrochromic element is typically required to operate at a voltage of less than 1.5 volts. In a typical application, the drive circuit is required to regulate the voltage applied to each electrochromic element to about 1.2 volts, and thus the drive circuit must drop the remaining voltage potential applied by the battery. When two electrochromic elements are connected in series, a total voltage of up to 2.4 volts may be applied across the two series connected electrochromic elements. To drop the remaining voltage potential (e.g., 12 volts−2.4 volts=9.6 volts), the conventional drive circuit typically employs a series pass transistor. One example of a series drive circuit is disclosed in U.S. Pat. No. 5,956,012, which is hereby incorporated herein by reference. The use of the series pass transistor to drop the voltage to an EC operating level generally results in power dissipation that is converted to thermal energy. Excessive thermal energy generated in the series transistor within the mirror housing may damage the drive circuit and other electronic circuitry, and thus temperature tolerant components are generally required which adds to the cost.

The drive circuit is typically made-up of electronic components, some of which may be formed on an integrated circuit. However, many of the components of the drive circuit in conventional electrochromic mirror applications are not formed on the same integrated circuit, but instead are configured on multiple circuits which are hard-wired on a circuit board due in part to the requirement to dissipate the thermal energy away from the integrated circuit chip. Previous attempts have been made to more fully integrate the electrochromic element drive circuitry, but such attempts generally have not optimized the integration of the drive circuit components while meeting the heat dissipation requirements.

It is therefore desirable to more fully integrate the electrochromic element drive circuit components into an integrated circuit, while dissipating thermal energy in a manner that does not adversely affect the drive circuit. It is also desirable to control one or more electrochromic elements to vary the reflectance and manage temperature constraints. It is further desirable to control the reflectance ratio of multiple electrochromic elements.

SUMMARY OF THE INVENTION

According to one aspect of the present invention, a drive control circuit is provided for controlling an electrochromic element. The drive control circuit includes an input for receiving an input voltage, and a current regulator coupled to the input for generating one of at least first and second discrete amounts of current. According to one embodiment, the current regulator includes first and second current supply lines for supplying the respective first and second discrete amounts of current. Both current supply lines can further supply current at the same time, thereby providing a third discrete amount of current. The drive control circuit also includes a controller for controlling the current regulator to select one of the discrete amounts of current to drive an electrochromic element. A drive circuit output is provided for supplying the selected one of the discrete amounts of current to the electrochromic element.

According to another aspect of the present invention, a control circuit is provided for controlling an electrochromic element. The control circuit includes an integrated circuit chip, and drive circuitry substantially integrated in the integrated circuit chip for driving the electrochromic element. The drive circuitry includes a current control circuit configured to supply current to an electrochromic element. According to one embodiment, a processor is also formed in the integrated circuit chip, and the current control circuit includes first and second resistors providing at least first and second discrete amounts of current and is located separate from the integrated circuit chip, thus dissipating thermal energy outside of the chip.

According to a further aspect of the present invention, a control system is provided for individually controlling a plurality of electrochromic elements by controlling a ratio of the reflectance of the individual electrochromic elements. The control system includes an input for receiving an input voltage, individual shunts connected in parallel with each electrochromic element, and at least one sensor. The at least one sensor senses glare. A controller controls a ratio of the reflectance of the individual electrochromic elements as a function of the sensed glare.

These and other features, advantages and objects of the present invention will be further understood and appreciated by those skilled in the art by reference to the following specification, claims and appended drawings.

DETAILED DESCRIPTION OF THE PREFERRED EMBODIMENTS

Figure 1:
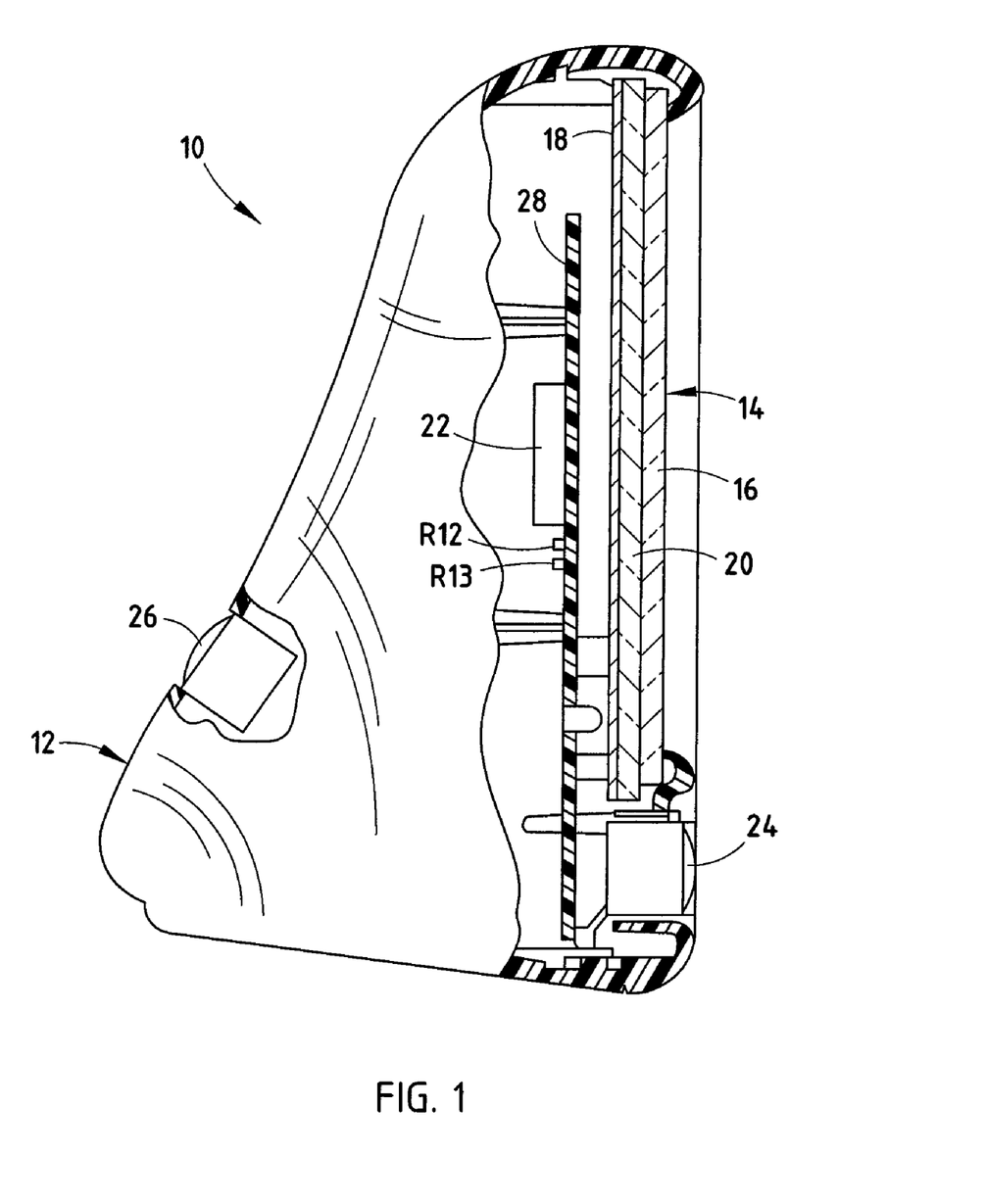
FIG. 1 is a partial cross-sectional view of a rearview mirror having an electrochromic element (EC) and controls for controlling one or more electrochromic elements.

Referring to FIG. 1, a mirror assembly is shown having a housing 12 and a mirror subassembly 14 (referred to herein as "mirror 14") mounted in an opening in the front face of the housing 12. The mirror 14 is an electrochromic mirror having an electrochromic element that is electrically controllable to adjust reflectance so as to control the amount of glare reflected to a viewer (e.g., driver of a vehicle). The mirror assembly 10 shown is generally referred to as an inside rearview mirror which is intended to be mounted within the passenger compartment of a vehicle. The vehicle may also be equipped with one or more outside rearview mirrors each having an electrochromic element. The present invention employs controls, including an electrochromic drive circuit, that control the inside electrochromic element and the outside electrochromic element(s).

The mirror 14 is shown having a first transparent substrate 16 arranged in front of a second substrate 20, which may also be transparent. First and second electrodes are provided on one or both of the opposed surfaces of substrates 16 and 20. An electrochromic medium is disposed between substrates 16 and 20 in electrical contact with the first and second electrodes. As shown in FIG. 1, a reflective layer 18 is provided on the rear surface of second substrate 20 and is arranged to provide reflectance towards the front of the mirror assembly 10. The reflector 18 may alternatively be provided on the front surface of second substrate 20 and may function as one of the electrodes. It should be appreciated that mirror subassemblies containing electrochromic elements are widely known and are commonly employed in vehicle rearview mirror assemblies to control glare from an external light source that is reflected to the driver. The electrochromic drive circuit of the present invention may be used to control and drive various types of electrochromic elements for use in a variety of applications.

Mounted within mirror assembly 10 is a printed circuit board 28 having circuit elements mounted thereto for controlling the inside electrochromic mirror 14 and further controlling one or more outside electrochromic mirrors. Mounted on the printed circuit board 28 is an application specific integrated circuit (ASIC) chip 22, and a pair of resistors R12 and R13 which are mounted separate from the ASIC chip 22. The ASIC chip 22 is an integrated circuit including control circuitry dedicated to control operation of the inside electrochromic mirror 14 and, optionally, one or more outside electrochromic elements to control mirror reflectance to reduce glare of the mirror assembly 10 when light dimming is desired. The printed circuit board 28 may further include additional electronic components assembled thereto that may be used to control other electronic devices integrated within the mirror assembly 10. The printed circuit board 28 may include other electronics and displays such as an electronic compass and LEDs as should be evident to those skilled in the art.

The mirror assembly 10 senses glare light forward of the mirror (rearward of the vehicle) with a glare light sensor 24. Ambient light rearward of the mirror (forward of the vehicle) is also sensed on the backside of the mirror by way of an ambient light sensor 26. The ambient light sensor 26 senses the baseline ambient lighting conditions of the surrounding environment (e.g., daytime or nighttime lighting) and generates an ambient light signal, while the glare light sensor 24 senses the amount of glare illuminating the mirror assembly 10 due to an external light source and generates an ALS glare signal. Sensors 24 and 26 may include conventional light sensing devices or the active light sensor (ALS) disclosed in U.S. Pat. No. 6,359,274 entitled "PHOTODIODE LIGHT SENSOR," which is hereby incorporated herein by reference. The sensor outputs may be processed as disclosed in U.S. patent application Ser. No. 09/307,941, now U.S. Pat. No. 6,402,328, entitled "AUTOMATIC DIMMING MIRROR USING SEMICONDUCTOR LIGHT SENSOR WITH INTEGRAL CHARGE COLLECTION," the entire disclosure of which is incorporated herein by reference.

Figure 2:
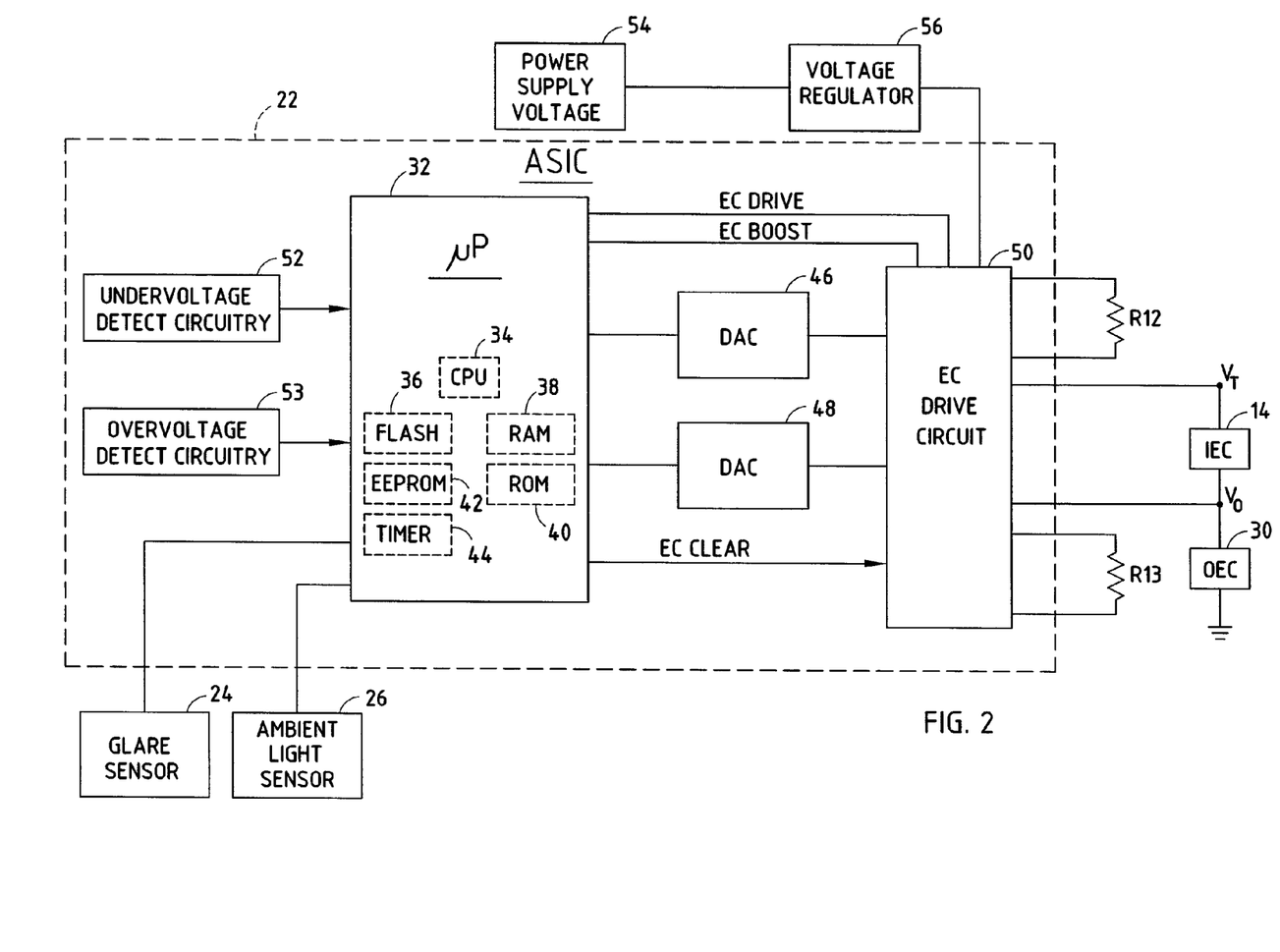
FIG. 2 is a block diagram illustrating an application specific integrated circuit (ASIC) having EC drive control circuitry for controlling two electrochromic elements.

According to one aspect of the present invention, the ASIC 22 includes an electrochromic (EC) drive circuit 50, generally shown in FIG. 2, for driving one or more electrochromic elements, such as the series connected inside electrochromic element (IEC) 14 and outside electrochromic element (OEC) 30. The inside electrochromic element 14 is generally located in the inside rearview mirror assembly 10, while the outside electrochromic element 30 is located in an outside rearview mirror, typically mounted on the side of the vehicle according to conventional vehicle mirror arrangements. The outside electrochromic element 30 may include a single electrochromic element or may include two or more electrochromic elements connected in parallel. A substantial amount of the control circuitry for controlling the electrochromic elements, including substantially all of the EC drive circuit 50, is formed in the integrated circuit, shown as the ASIC 22. A substantial amount of the EC drive circuit 50 is integrated in the ASIC 22, with the exception of resistors R12 and R13 which are located off-chip to dissipate thermal energy (heat) to a location outside of the ASIC 22. As a consequence, the EC drive circuit 50 dissipates thermal energy generated by resistors R12 and R13 away from the ASIC 22, thus relaxing the thermal tolerance requirements for ASIC 22 and allowing for the use of less expensive integrated circuitry.

The ASIC 22 is shown having a microprocessor 32, undervoltage detect circuitry 52, overvoltage detect circuitry 53, a pair of digital-to-analog converters (DACs) 46 and 48, and the EC drive circuit 50. The EC drive circuit 50 controls the voltage and current applied to each of the inside electrochromic element 14 and the outside electrochromic element 30, responsive to control command signals received from the microprocessor 32. The EC drive circuit 50 is powered by a power supply voltage 54, such as twelve volts (12 v) DC supplied from a vehicle battery, which may be regulated by way of voltage regulator circuit 56. According to the embodiment shown, the microprocessor 32 is generally configured to include a central processing unit (CPU) 34, a timer 44, and memory, including flash memory 36, random access memory (RAM) 38, read-only memory (ROM) 40, and electrically erasable programmable read-only memory (EEPROM) 42. The microprocessor 32 may include a conventional microprocessor for processing one or more programmed control routines to control operation of the electrochromic elements 14 and 30, as described herein. The undervoltage detect circuitry 52 detects the presence of an undervoltage condition which occurs when the voltage supply output from voltage regulator circuit 56 is less than a predetermined voltage potential (e.g., less than 11.5 volts). When an undervoltage condition is detected, circuitry 52 provides an undervoltage detection signal input to the microprocessor 32. The overvoltage detect circuitry 53 detects the presence of an overvoltage condition which occurs when the voltage supply output from voltage regulator circuit 56 is greater than a predetermined voltage potential (e.g., greater than 17.1 volts). When an overvoltage condition is detected, overvoltage detect circuitry 53 provides an overvoltage detection signal input to microprocessor 32 which, in turn, turns off the EC DRIVE and EC BOOST signals. Microprocessor 32 also receives the sensed light signals from the glare light sensor 24 and the ambient light sensor 26. The sensed light signals are processed to determine a relative amount of glare impinging on the mirror to determine whether to dim the mirror and, if so, how much dimming is required.

Figure 3:
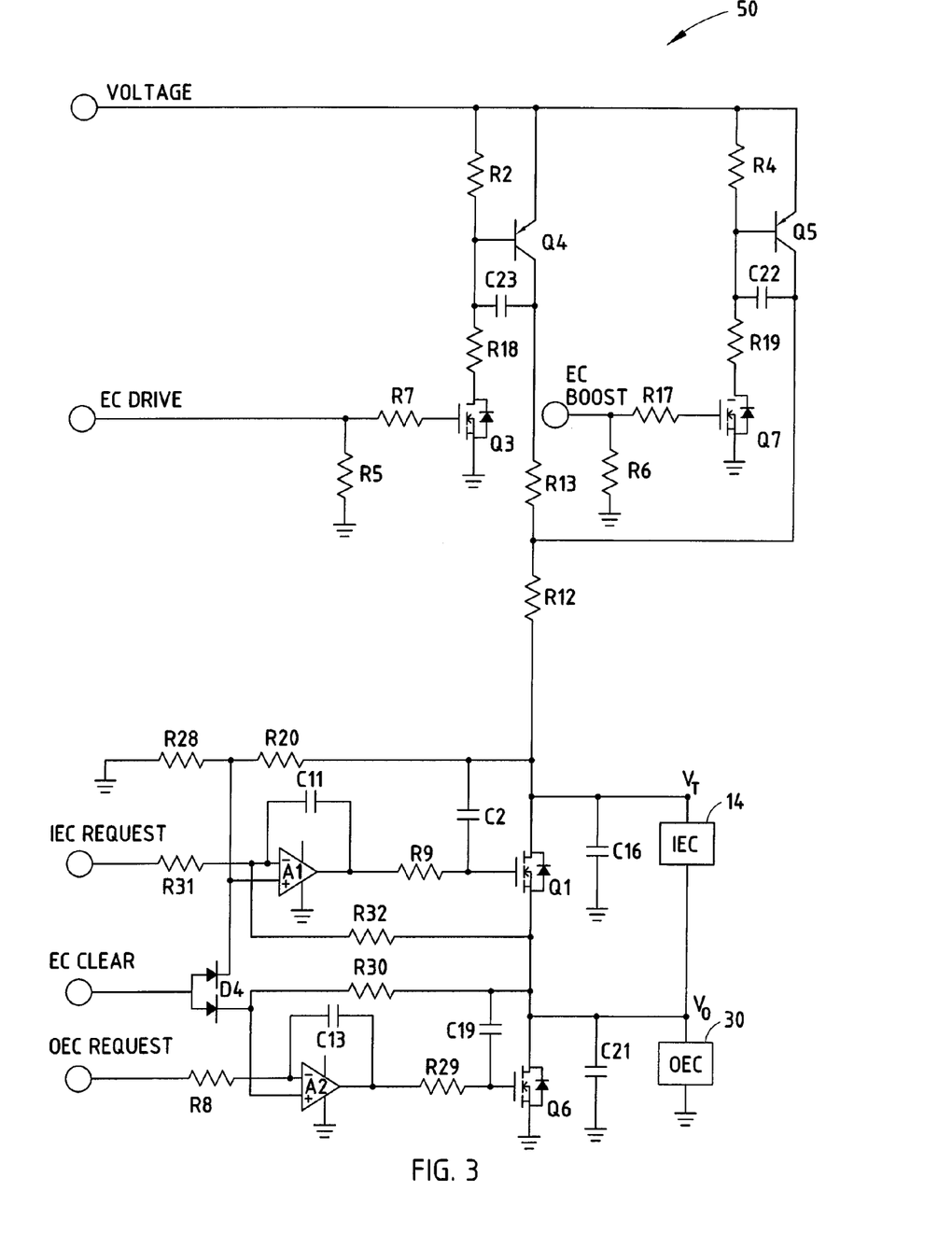
FIG. 3 is a circuit diagram further illustrating the EC drive circuit.

The EC drive circuit 50 is illustrated in detail in FIG. 3. EC drive circuit 50 has a voltage input line receiving a VOLTAGE (e.g., 12 volts) from the voltage regulator 56, and a pair of current control input lines for receiving an EC DRIVE signal and an EC BOOST signal from the microprocessor 32. The EC DRIVE signal is applied to cause current to pass through both resistors R12 and R13 to supply a discrete amount of drive current to the electrochromic elements 14 and 30. The EC BOOST signal is applied to cause current to bypass resistor R13 so as to increase the amount of current passing through resistor R12 to a higher discrete amount of current which is supplied to the electrochromic elements 14 and 30 to enable quick darkening of the electrochromic elements 14 and 30. The EC BOOST signal is applied to quickly darken electrochromic elements 14 and 30, while the EC DRIVE signal supplies a lower discrete amount of recombination current to maintain the darkening of the electrochromic elements 14 and 30.

The EC drive circuit 50 has another pair of input lines for receiving an IEC REQUEST signal and an OEC REQUEST signal output from first and second DACs 46 and 48, respectively. The IEC and OEC REQUEST signals together control the ratio of reflectance of the inside and outside electronic elements 14 and 30, respectively. The IEC and OEC REQUEST signals are controllably selected by microprocessor 32 to provide the reflectance ratio as described herein. Further, EC drive circuit 50 has an input line for receiving an EC CLEAR signal from microprocessor 32 when mirror dimming is no longer desired. The EC CLEAR signal generates a short circuit to ground across the electrochromic elements 14 and 30 which causes the charge on the electrochromic elements 14 and 30 to be cleared so as to quickly undarken the electrochromic elements 14 and 30.

A high voltage on the EC DRIVE signal current control line causes transistor Q4 to close and thus pass a first discrete amount of current through a drive line including resistors R12 and R13 which provides a recombination current to the electrochromic elements 14 and 30. When an increase in current is requested, such as to quickly darken the electrochromic elements 14 and 30, a high voltage signal is applied to the EC BOOST signal current control line for a limited time period (e.g., four seconds) to cause transistor Q5 to close and pass current through resistor R12. With the EC BOOST signal applied, transistor Q5 essentially bypasses the drive line including resistor R13 to generate an increased second discrete amount of current to quickly darken electrochromic elements 14 and 30. When the limited time period for applying the increased second discrete amount of current expires, the electrochromic elements are thereafter driven by the lower first amount of current which supplies recombination current to keep the electrochromic elements darkened, for as long as mirror dimming is desired.

The EC DRIVE signal is applied to the drive current control line having resistors R5 and R7 coupled to the gate of transistor Q3, with resistor R5 configured as a pull down resistor. With transistor Q3 turned on, resistors R2 and R18 provide a voltage at the base of drive transistor Q4 to turn on drive transistor Q4. Capacitor C23 provides edge (slew) rate control. The EC BOOST signal is applied to the boost current control line likewise having resistors R6 and R17 coupled to the gate of a transistor Q7, with resistor R6 configured as a pull down resistor. With transistor Q7 turned on, resistors R4 and R19 provide a voltage at the base of boost transistor Q5 to turn on boost transistor Q5. Capacitor C22 provides edge (slew) rate control. When the drive transistor Q4 is turned on, a first level of current is generated through resistors R13 and R12. When boost transistor Q5 is turned on, a second higher amount of current is generated through resistor R12 to thereby increase the amount of current supplied to the electrochromic elements 14 and 30. It should be appreciated that during a current boost the boost transistor Q5 will bypass resistor R13 regardless of whether drive transistor Q4 is turned on or off.

The electrochromic elements 14 and 30 each include series connected shunt devices, shown as shunt transistors Q1 and Q6, respectively. Shunt transistor Q1 is used to shunt current around the inside electrochromic element 14 to maintain a desired voltage $V_T$ applied to inside electrochromic element 14. Likewise, shunt transistor Q6 is used to shunt current around the outside electrochromic element 30 to maintain a desired voltage $V_O$ applied to outside electrochromic element 30. The shunt transistors Q1 and Q6 are used to balance the voltage across the inside electrochromic element 14 and the outside electrochromic element 30. If the voltage across the outside electrochromic element 30 exceeds a predetermined ratio (fraction) of the total voltage $V_T$, the shunt transistor Q6 is turned on to balance the voltage $V_O$ at the predetermined ratio. The predetermined ratio is set by the IEC REQUEST and OEC REQUEST signals. The ratio of reflectance achieved with the inside and outside electrochromic elements 14 and 30 can be varied by adjusting the IEC REQUEST and OEC REQUEST signals, as described herein.

The inside and outside electrochromic elements 14 and 30 are controlled such that the reflectance of each electrochromic element is a function of the voltage applied across each of the elements. Electrochromic elements are typically controlled between 0 and 1.2 volts and, thus, two series connected electrochromic elements are typically controlled between 0 and 2.4 volts. The total voltage applied to the series connected electrochromic elements 14 and 30 is shown as voltage $V_T$, while the voltage applied to the outside electrochromic element 30 is shown as voltage $V_O$ which is equal to the total voltage $V_T$ minus the voltage $V_I$ dropped across the inside electrochromic element 14. The shunt transistors Q1 and Q6 are connected in parallel across the serially-connected electrochromic elements IEC 14 and OEC 30, respectively. The total voltage $V_T$ and the outside voltage $V_O$ are monitored to maintain the selected voltages across each of the serially-connected electrochromic elements 14 and 30 at a controlled fraction of the total voltage $V_T$. If the voltage across either of the serially-connected electrochromic elements 14 and 30 varies, the shunt transistors Q1 and Q6 either shunt current or source current to the electrochromic elements 14 and 30, such that the voltage across each of the electrochromic elements 14 and 30 is at a controlled ratio (fraction) of the total voltage $V_T$. Accordingly, the shunt transistors Q1 and Q6 are used to balance the voltage applied across each of the series-connected electrochromic elements 14 and 30.

If the voltage across either of the electrochromic elements 14 and 30 exceeds the controlled fraction of the total voltage $V_T$, one of the shunt transistors Q1 or Q6 is turned on to balance the voltage. The controlled reflectance ratio of the electrochromic elements 14 and 30 is controlled by IEC and OEC REQUEST signals which are output from a pair of DACs 46 and 48. According to one embodiment, the ratio of voltage applied to the inside electrochromic element 14 and outside electrochromic element 30 may be set at a ratio of 1:1 so as to apply the same voltage (fifty percent of $V_T$) to each of the electrochromic elements 14 and 30. However, in vehicles having window glass of different transmissivity, the reflectance ratio for the outside rearview mirror and the inside rearview mirror electrochromic elements may be controlled at a different ratio so as to compensate for the different window transmissivities.

The ratio of reflectance is determined by the value of the IEC REQUEST and OEC REQUEST signals. The IEC REQUEST signal is shown applied via resistor R31 to an inverting input of an operational amplifier A1 that is configured as a differential amplifier having a feedback with a resistor R20 coupled to the non-inverting input. The output of the amplifier A1 is applied via resistor R9 to the gate of shunt transistor Q1. The OEC REQUEST signal is likewise applied via a resistor R8 to an inverting input of an operational amplifier A2 configured as a differential amplifier having a feedback with a resistor R30 coupled to the non-inverting input. The output of amplifier A2 is applied via resistor R29 to the gate of shunt transistor Q6. When the outside voltage $V_O$ is crossed, electrochromic element 30 exceeds the controlled fraction of the total voltage $V_T$ and the output of the amplifier A2 causes shunt transistor Q6 to turn on, thereby shunting current applied to outside electrochromic element 30 until the voltage around the electrochromic element 30 is at the controlled fraction of the total voltage $V_T$. Resistor R29 and capacitors C13 and C19 are used to stabilize the feedback loop around shunt transistor Q6, while resistor R9 and capacitors C11 and C2 stabilize the feedback loop around the shunt transistor Q1.

The shunt transistors Q1 and Q6 are further used to provide a short circuit to ground to quickly clear the electrochromic elements 14 and 30 in response to an EC CLEAR signal. The EC CLEAR signal is applied to amplifiers A1 and A2 via diodes D4 to cause the gate of shunt transistors Q1 and Q6 to be driven high, turning transistors Q1 and Q2 fully on and thereby clearing the inside and outside electrochromic elements 14 and 30 when light dimming of the mirror is no longer required. The EC CLEAR signal is generated by microprocessor 32 when the ambient light signals indicate that glare is not present and maximum mirror reflectance is desired.

Figure 4:
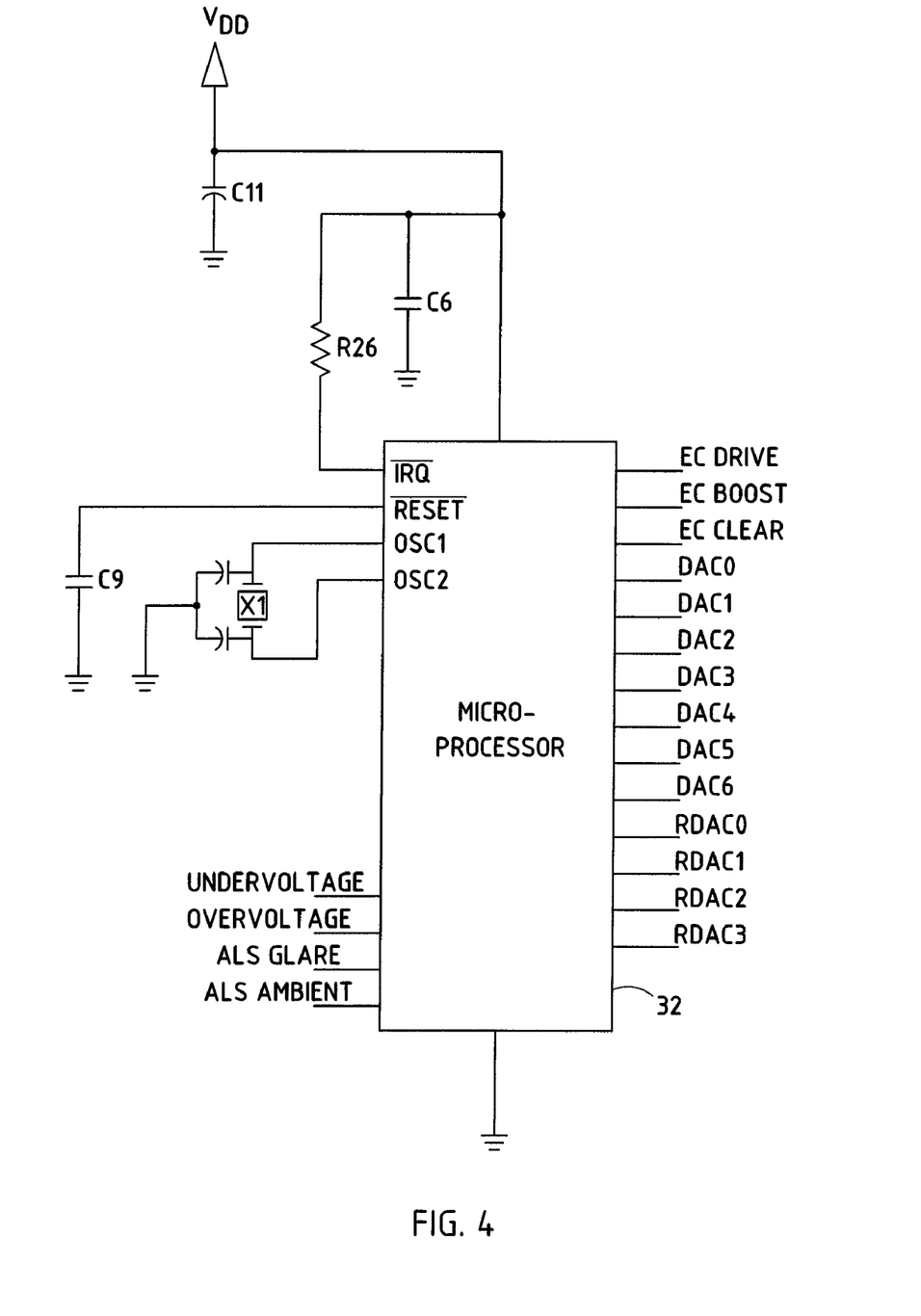
FIG. 4 is a block/circuit diagram further illustrating the microprocessor.

The microprocessor 32 is further shown in FIG. 4 having various inputs including overvoltage, undervoltage, ALS glare, ALS ambient, oscillator inputs OSC1 and OSC2 from resonator X1, reset, and interrupt inputs. The microprocessor 32 is programmed to perform various control routines to control operation of the inside and outside electrochromic elements 14 and 30. Microprocessor 32 generates the EC DRIVE, EC BOOST, and EC CLEAR signals. In addition, microprocessor 32 generates a plurality of outputs DAC0 through DAC6 and RDAC0 through RDAC3 which serve as inputs to control the DAC 46 and 48.

Figure 5:
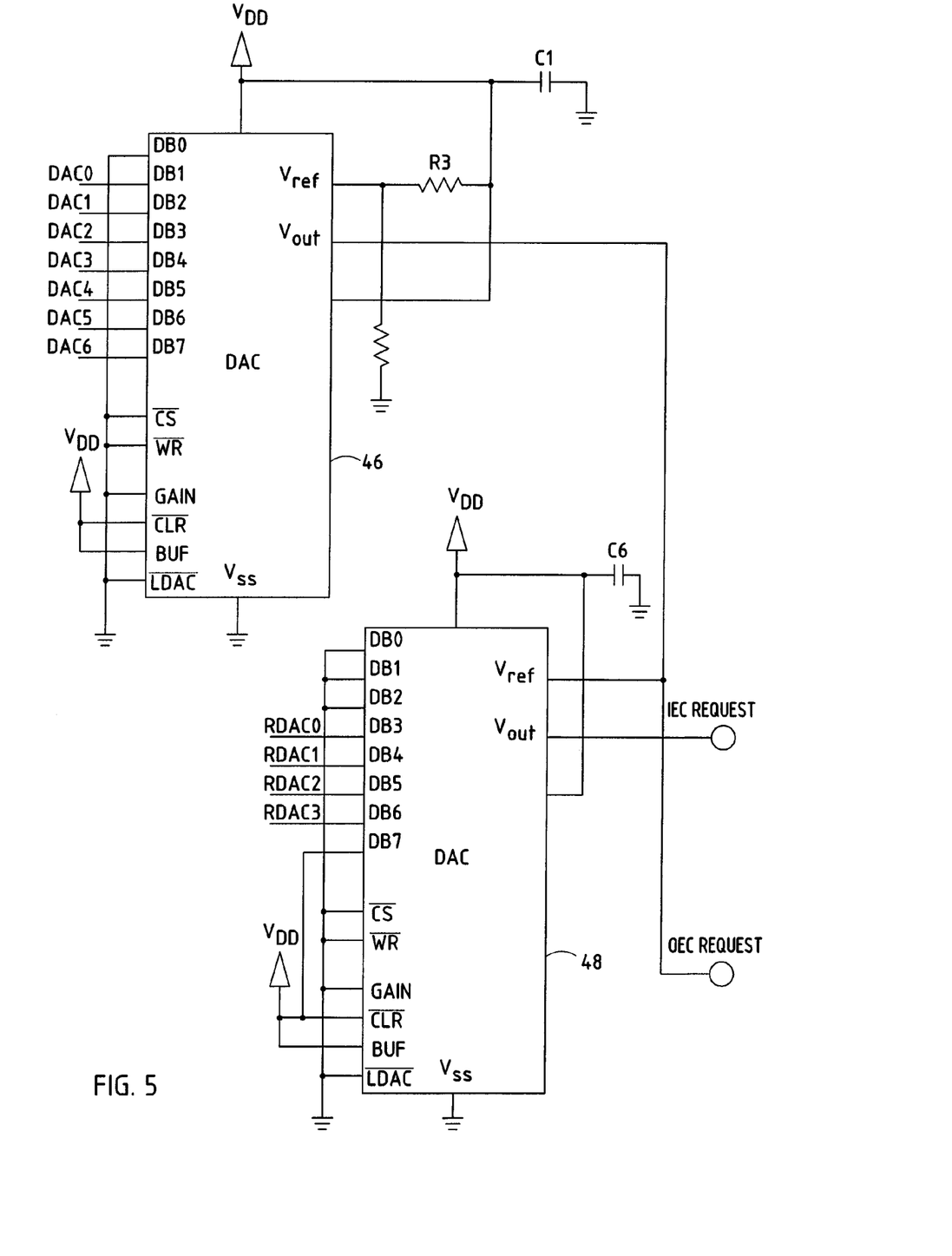
FIG. 5 is a block/circuit diagram further illustrating the pair of DACs.

The DACs 46 and 48 are further shown in FIG. 5. DAC 46 receives output signals DAC0 through DAC6 from microprocessor 32 on input pins DB1 through DB7. Similarly, DAC 48 receives output signals RDAC0 through RDAC3 from microprocessor 32 on input pins DB3 through DB6. Each of the DACs 46 and 48 are configured with multiple selections of reflectance values for setting the reflectance ratio of the electrochromic elements 14 and 30. DAC 46 has seven input pins DB1 through DB7 corresponding to one hundred twenty-eight (128) selectable reflectance values of which one may be selected via microprocessor 32 to generate the OEC REQUEST signal. Similarly, DAC 48 has four input pins DB3 through DB6 corresponding to sixteen (16) selectable reflectance ratios of which one may be selected via microprocessor 32 to generate the IEC REQUEST signal. When one input pin to each of the DACs 46 and 48 is selected by microprocessor 32, the DACs 46 and 48 provide a predetermined output level on each of signals IEC REQUEST and OEC REQUEST. Accordingly, DACs 46 and 48 may accommodate a large variety of vehicles by providing a plurality of available reflectance value settings which may be selected and varied by microprocessor 32 to control the ratio of reflectance of the inside and outside electrochromic elements 14 and 30.

Figure 6:
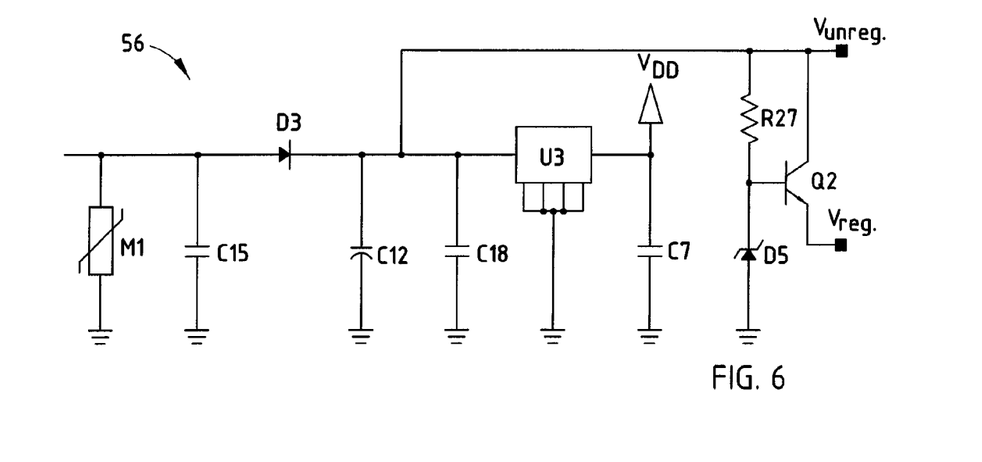
FIG. 6 is a circuit diagram illustrating voltage regulation circuitry for regulating the voltage applied to the EC drive circuit.

The voltage regulator 56 is shown in FIG. 6 for generating both a regulated voltage $V_{reg}$ and an unregulated voltage $V_{unreg}$. It should be appreciated that voltage regulator 56 makes available both a regulated voltage and an unregulated voltage, either of which may be used to supply the VOLTAGE input to the EC drive circuit 50. Voltage regulator 56 includes a surge protector metal oxide varistor (MOV) M1, capacitors C15, C12, C7, and C18, 78L05 voltage regulator (5 V) U3, and diode D3 receiving the ignition voltage (e.g., 12 volts) from the vehicle battery. According to one embodiment, the unregulated ignition voltage $V_{unreg}$ may be applied as the VOLTAGE signal to EC drive circuit 50. The voltage regulator 56 also includes resistor R27, zener diode D5, and a Darlington-connected transistor Q2 which form a preregulator for regulating the unregulated voltage so as to drop the unregulated voltage to a desired voltage level. According to one example, the preregulator may generate a regulated voltage $V_{reg}$ of 10.5 volts. It should be appreciated that the VOLTAGE signal input to the EC drive circuit 50 may be controlled to any desired level depending on the voltage requirements for a specific application.

Figure 7:
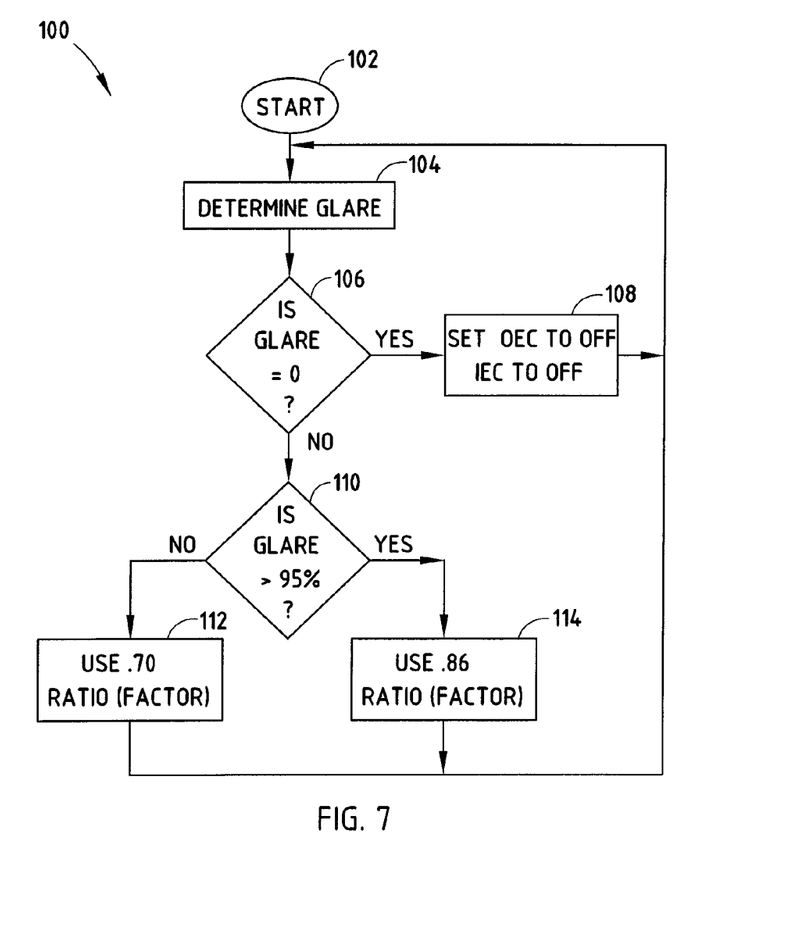
FIG. 7 is a flow diagram illustrating a method of controlling the EC reflectance ratio of the inside and outside electrochromic elements.

Referring to FIG. 7, a routine 100 is presented for controlling the ratio of reflectance of the inside and outside electrochromic elements 14 and 30. It should be appreciated that when a motor vehicle employs window glass of different transmissivities, the transmissivity of the side and rear vehicle windows may differ. For example, a vehicle may have a transmissivity of seventy percent (70%) for side windows and thirty percent (30%) for rear windows. To compensate for the variations in transmissivity between the rear and side windows, the inside and outside electrochromic elements 14 and 30 are controlled at different voltage potentials. However, there exist extreme glare conditions where it may be desirable to further darken one of the electrochromic elements by varying the reflectance ratio. For example, if extreme glare is illuminating the mirrors, it may be desirable to vary the reflectance ratio to increase mirror dimming of one of the mirrors.

The reflectance ratio control routine 100 starts at step 102 and proceeds to determine the amount of glare detected by the glare light sensor 24 in step 104. If the determined amount of glare is equal to approximately zero, as determined in decision step 106, control routine 100 proceeds to turn off both the inside and outside electrochromic elements 14 and 30, respectively, and then returns to step 104. The electrochromic elements 14 and 30 are turned off by applying the EC CLEAR signal to minimize mirror dimming, and thereby maximize mirror reflectance. Accordingly, the electrochromic elements 14 and 30 remain off as long as the glare is determined to be approximately zero.

If the amount of determined glare is not equal to approximately zero, reflectance ratio control routine 100 proceeds to decision step 110 to determine if the detected glare is greater than a predetermined limit of ninety-five percent (95%). If the glare is not greater than ninety-five percent (95%), the control routine 100 uses a first IEC/OEC reflectance ratio factor of 0.70 in step 112. Accordingly, the IEC/OEC reflectance ratio factor is set to a value of 0.70 whenever the glare is greater than zero and does not exceed ninety-five percent (95%). Generally speaking, the glare will not exceed ninety-five percent (95%) during normal nighttime driving conditions. However, there exist situations when, for example, in an automotive vehicle application, the headlights of a following vehicle extremely illuminate the inside mirror, it may be advantageous to adjust the ratio factor to more fully darken the inside electrochromic element to reduce the extreme glare.

If it is determined that the determined glare is greater than ninety-five percent (95%), indicative of extreme glare, control routine 100 uses a second higher IEC/OEC reflectance ratio factor of 0.86 in step 114. Accordingly, the ratio factor is selected based on the amount of glare as determined by the glare light sensor 24. Control routine 100 continues to cycle through the reflectance ratio control routine 100 by returning to step 104. While reflectance ratio control routine 100 is shown and described herein as selecting between two discrete reflectance ratio factors of 0.70 and 0.86, according to one example, it should be appreciated that the control routine 100 may compare the amount of glare to two or more discrete glare levels, and may generate any of a number of plurality of ratio factors for controlling the reflectance ratio of the inside and outside electrochromic elements 14 and 30.

Figure 8:
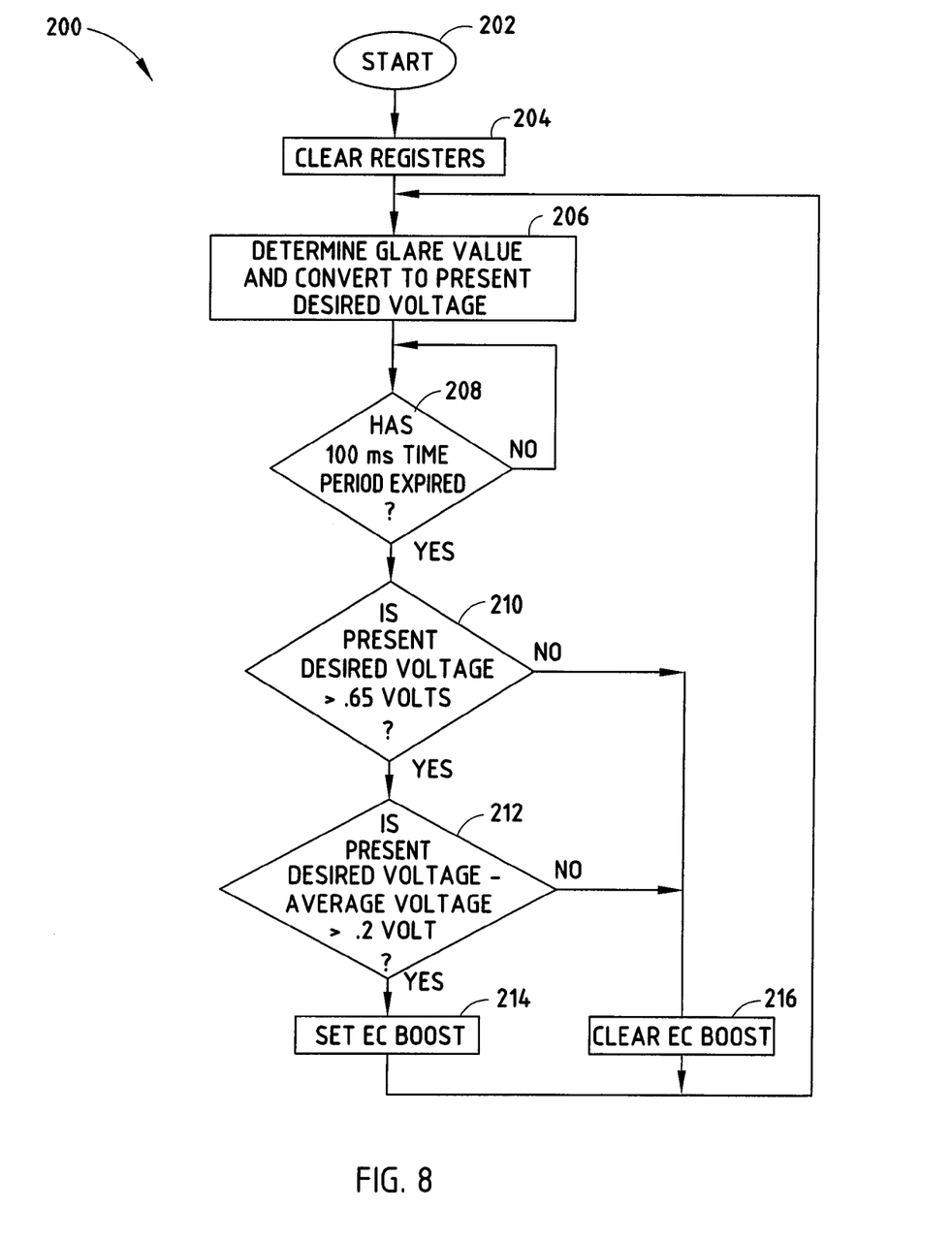
FIG. 8 is a flow diagram illustrating a method of controlling the EC BOOST signal applied to the EC drive circuit.

Referring to FIG. 8, a routine 200 is shown for generating the EC BOOST command signal. Routine 200 starts at step 202 and proceeds to step 204 to clear registers pertaining to the EC BOOST application. Next, in step 206, routine 200 determines the glare value and converts the glare value to a present desired voltage. The present desired voltage is indicative of a voltage desired across the individual electrochromic element(s). Thereafter, in decision step 208, routine 200 checks for whether a one hundred (100) millisecond time period has expired and, if not, waits until the time period expires. Accordingly, a present desired voltage is obtained at each one hundred (100) millisecond time period.

Following expiration of the one hundred (100) millisecond time period, routine 200 proceeds to decision step 210 to determine if the present desired voltage exceeds a predetermined voltage of 0.65 volts, according to one example. If the present desired voltage exceeds a voltage of 0.65 volts, routine 200 proceeds to decision step 212 to determine if the difference of the average voltage subtracted from the present desired voltage is greater than 0.2 volts and, if so, sets the EC BOOST flag in step 214. If the present desired voltage is not greater than 0.65 volts, as determined in decision step 210, or if the difference in an average voltage subtracted from the present desired voltage is not greater than 0.2 volts in step 212, routine 200 proceeds to clear the EC BOOST flag in step 216. Accordingly, the EC BOOST flag is set or cleared to allow or disallow application of the EC BOOST signal to control application of the BOOST current. Following the setting or clearing of the EC BOOST signal, routine 200 returns to step 206.

Figure 9:
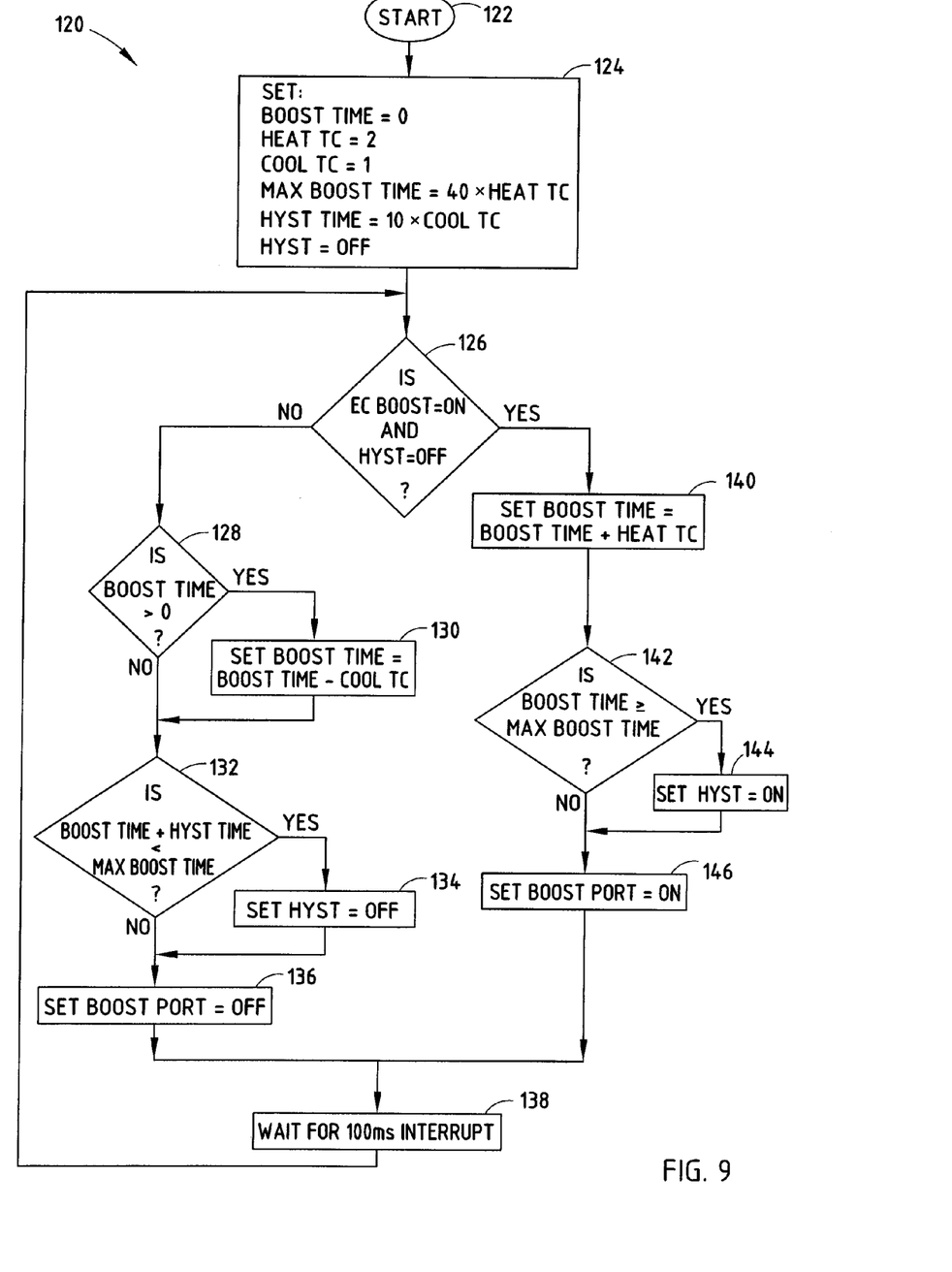
FIG. 9 is a flow diagram illustrating a method of controlling the EC drive circuit based on a thermal model.

Referring to FIG. 9, a control routine 120 is shown for controlling the EC drive circuit 50 to provide thermal protection. The thermal control routine 120 begins at step 122 and proceeds to step 124 to set the following parameters: boost time=0; heat time constant (TC)=2; cool time constant (TC)=1; max boost time=forty (40)×heat TC; HYST time=ten (10)×cool TC; and HYST flag=off. The boost time is the accumulated time in the high current boost mode in 0.1 second units. The heat time constant sets a relative heating rate in the thermal model. The cool time constant sets a relative cooling rate in the thermal model. The max boost time is the maximum time allowed for high current boost mode in 0.1 second units. The HYST time sets the size of the hysteresis band in the 0.1 second units. The HYST flag is either set or cleared to indicate if within the hysteresis band. According to one example, the heat TC and cool TC values correspond to a loop time period of 0.1 seconds for each count value of 1.0. However, the loop time period may vary.

Following the initial selection of the aforementioned parameters, thermal control routine 120 proceeds to decision step 126 to determine if both the EC BOOST signal is on and the hysteresis flag is turned off. If the EC BOOST signal is left on for an extended period of time, a buildup of thermal energy may result in excessive heating of the drive circuit 50. Accordingly, thermal control routine 120 monitors the time that the EC BOOST signal is on, and causes the EC BOOST signal to remain off for a sufficient period of time to allow the EC drive circuit to cool. The EC BOOST signal is continuously applied for a time period that may not exceed a maximum time period of four seconds, according to one example. If the EC BOOST signal is repeatedly applied within a short time period, the application time period is maintained and controlled to prevent excessive heating. If the EC BOOST signal is on and the hysteresis flag is off, control routine 120 proceeds to increment the boost time value by the value of TC=2 in step 140. Next, in decision step 142, thermal control routine 120 checks for whether the BOOST signal has been on for greater than a maximum allowed boost time and, if so, proceeds to set the hysteresis flag to on in step 144. In step 146, a boost port is set on, prior to waiting for a one hundred (100) millisecond interrupt delay in step 138. The boost port sets the actual microprocessor input/output port on (e.g., 5 volts) or off (e.g., 0 volts).

Returning back to decision step 126, if thermal control routine 120 determines that either of the conditions of the EC BOOST signal on and hysteresis flag off are not met, control routine 120 proceeds to decision step 128 to determine if the BOOST signal is greater than zero. If the BOOST signal is greater than zero, the boost time is decremented by the value of cool TC=1 in step 130. In decision step 132, thermal control routine 120 determines whether the summation of the boost time and hysteresis time is less than the maximum boost time and, if so, the hysteresis flag is turned off in step 134. In step 136, the boost port is turned off, followed by waiting for the interrupt time period of 100 milliseconds in step 138. Thermal protection routine 120 thereafter returns to decision step 126.

Accordingly, the thermal protection control routine 120 prevents the EC BOOST signal from applying increased current during conditions which may cause excessive temperature buildup in the integrated circuitry and/or resistors R12 and R13. Thermal control routine 120 employs counters which allow the EC BOOST signal to be applied up to a predetermined time period, such as four seconds, and employs counters to adjust the time period based on a thermal model of known characteristics of thermal heating and cooling. The boost time is adjusted up and down depending on the thermal model of the system. According to the example shown, the boost time is incremented twice as fast when the EC BOOST signal is applied during which thermal energy is generated, as compared to when the EC BOOST is not applied and the drive circuit 50 is cooling, during which the boost time is decremented at a slower rate since it is generally known that the drive circuitry cools at a slower rate than the buildup of heat occurs. Accordingly, the EC boost time count period is varied depending on the amount of heating and cooling that may be realized with the EC drive circuit.

Figure 10:
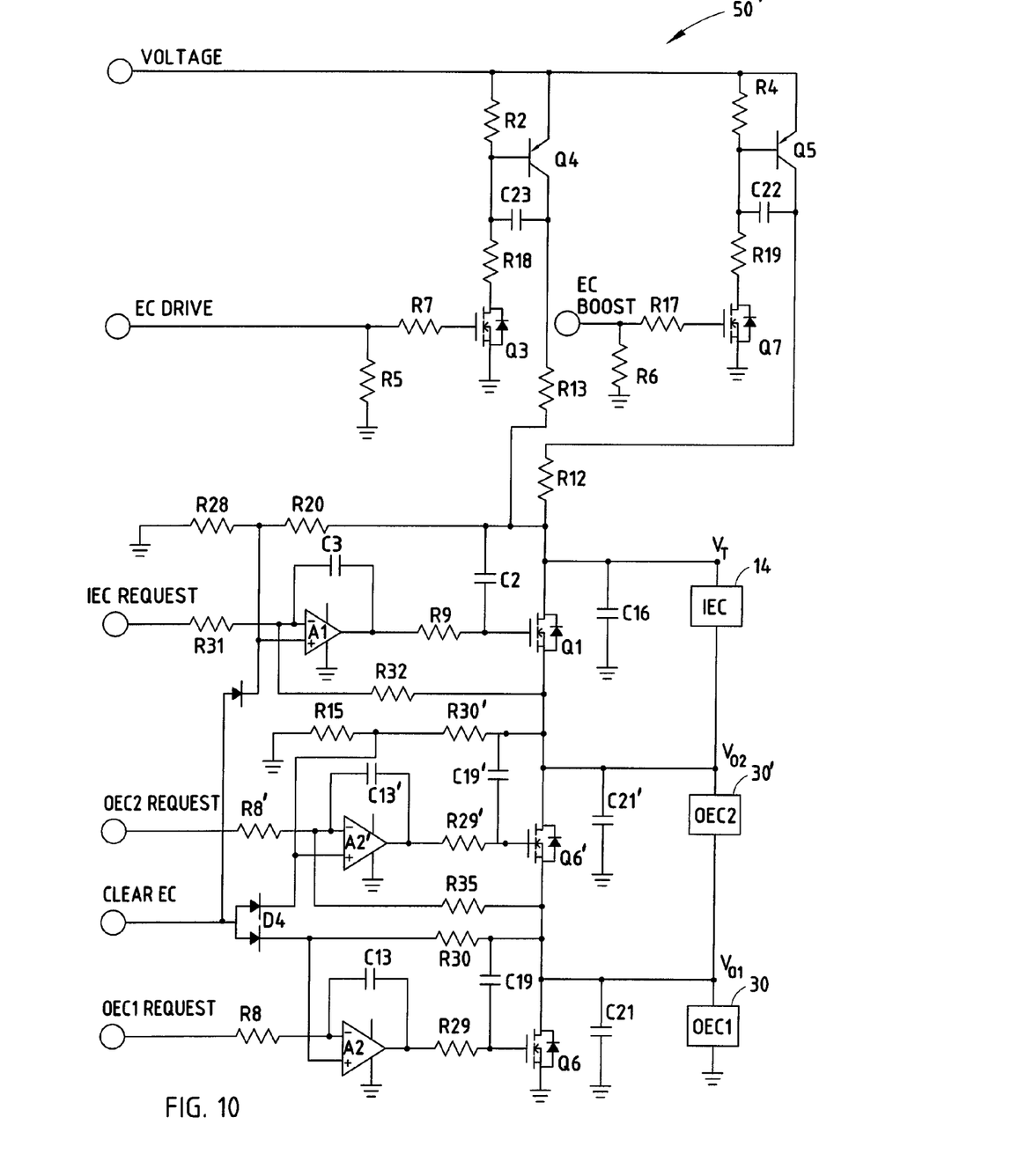
FIG. 10 is a circuit diagram illustrating an EC drive circuit having three electrochromic elements according to another embodiment.

Referring to FIG. 10, an EC drive circuit 50' is shown having three electrochromic elements and three discrete amounts of EC drive current to select from according to another embodiment of the present invention. The electrochromic elements shown in this embodiment include an inside electrochromic element 14, and two outside electrochromic elements OEC1 and OEC2 (30 and 30', respectively) which may be located in the outside side-mounted rear view mirror assemblies found on the driver and passenger sides of the vehicle. The outside electrochromic elements 30 and 30' may be connected in series as shown or, alternately, may be connected in parallel. The EC drive circuit 50' is substantially identical to EC drive circuit 50 described above and shown in FIG. 3 with the addition of two OEC request signals shown herein as OEC1 request and OEC2 request signals, and substantially duplicative circuitry for controlling the first and second outside electrochromic elements OEC1 and OEC2. In addition, resistors R13 and R14 are alternately connected in parallel lines. The circuit 50' includes duplicative circuitry for controlling electrochromic element OEC2 as is used for controlling the OEC described above including shunt transistor Q6', amplifier A2', resistors R8', R29', R30', and capacitors C13', C19', and C21'. Circuit 50' further includes resistors R15 and R35. It should be appreciated that certain aspects of the present invention may apply to any number of electrochromic elements.

According to this embodiment, resistors R12 and R13 are connected in parallel current paths such that resistor R13 is in a current path for supplying the drive current, while resistor R12 is in the current path for supplying the boost current. According to this embodiment, a first amount of discrete current may be supplied through resistor R12, a second higher amount of discrete current may be supplied via resistor R13, and a third higher discrete amount of current may be supplied by supplying current through both current paths having resistors R12 and R13. It should also be appreciated that more than three discrete amounts of current may be made available for driving the electrochromic elements.

Accordingly, the drive control circuit of the present invention advantageously is substantially integrated in an integrated circuit, with the exception of the resistors R12 and R13 which dissipate heat away from the integrated circuitry. The EC drive circuit 50 controls the amount of current supplied to the electrochromic elements 14 and 30 in discrete amounts by discretely increasing the amount of current supplied to the electrochromic elements to quickly darken the elements. The amount of time that the increased current is supplied to the electrochromic elements is controlled according to a thermal model to prevent overheating of the drive circuit. Additionally, the drive circuit controls the reflectance ratio of inside and outside electrochromic elements to vary the amount of reflectance based on an extreme glare detection.

Although a specific drive circuit is disclosed, certain aspects of the present invention may be utilized in other forms of drive circuits, such as, for example, the drive circuits disclosed in U.S. Pat. Nos. 6,247,819, and 6,386,713 the disclosures of which is incorporated herein by reference. Likewise, certain aspects of the invention may be implemented where the processor or DACs are not integrated in the ASIC circuit or where the drive circuit is not integrated in an ASIC. Further, while resistors R12 and R13 are shown and described herein, it should be appreciated that the first and second discrete amounts of current could otherwise be generated by current sources, regulators or other current regulator techniques. It should also be appreciated that three or more discrete amounts of current could be generated and used to drive the electrochromic elements.

Microprocessor 32 may additionally be programmed and configured to perform one or more of the following tasks: compute and display a compass heading (see U.S. Provisional Patent Application No. 60/360,723); control vehicle headlamps (see U.S. patent application Ser. No. 09/800,460, now U.S. Pat. No. 6,587,573); control the windshield wipers and/or climate control (see U.S. patent application Ser. No. 09/970,962, now U.S. Pat. No. 6,617,564); control all or a portion of a vehicle telematics system (see U.S. patent application Ser. No. 09/827,304, now U.S. Pat. No. 6,980,092); and/or additional tasks or functions. The entire disclosures of each of these patents are incorporated herein by reference.

It will be understood by those who practice the invention and those skilled in the art, that various modifications and improvements may be made to the invention without departing from the spirit of the disclosed concept. The scope of protection afforded is to be determined by the claims and by the breadth of interpretation allowed by law.

The invention claimed is:

1. A drive control circuit for controlling an electrochromic element, said drive control circuit comprising:
an input for receiving an input voltage;
a current regulator coupled to the input for generating one of at least first and second discrete amounts of current;
a controller for controlling the current regulator to select the one of the at least first and second discrete amounts of current to drive an electrochromic element; and
an output for supplying the selected one of the at least first and second discrete amounts of current to the electrochromic element.

2. The drive control circuit as defined in claim 1, wherein the current regulator comprises a first resistance path and a second resistance path connected between the input and the output, wherein the first resistance path generates the first discrete amount of current and the second resistance path generates the second discrete amount of current.

3. The drive control circuit as defined in claim 1, wherein the first discrete amount of current comprises a drive current for enabling the electrochromic element to darken at a first rate, and the second discrete amount of current comprises a boost current for enabling the electrochromic element to darken at a second faster rate.

4. The drive control circuit as defined in claim 1, wherein the current regulator comprises:
a first line coupled to the input for providing the first discrete amount of current; and a second line coupled to the input for supplying the second discrete amount of current, wherein the controller selects one of the first and second lines.

5. The drive control circuit as defined in claim 4 further comprising a first transistor for selecting the first line, and a second transistor for selecting the second line.

6. The drive control circuit as defined in claim 1, wherein the current regulator generates one of first, second, and third discrete amounts of current, and the output supplies the selected one of first, second, and third discrete amounts of current to the electrochromic element.

7. The drive control circuit as defined in claim 6, wherein the current regulator comprises a first resistance path and a second resistance path connected between the input and the output, wherein the first resistance path generates the first discrete amount of current, the second resistance path generates the second discrete amount of current, and a combination of the first and second resistance paths generates the third discrete amount of current.

8. The drive control circuit as defined in claim 1 further comprising a shunt connected in parallel to the electrochromic element for shunting current around the electrochromic element to maintain a predetermined voltage potential input to the electrochromic element.

9. The drive control circuit as defined in claim 1, wherein the output supplies the selected one of the at least first and second discrete amounts of current to a first electrochromic element and a second electrochromic element.

10. The drive control circuit as defined in claim 9 further comprising a first shunt coupled to the first electrochromic element and a second shunt coupled to the second electrochromic element.

11. The drive control circuit as defined in claim 10, wherein the first and second shunts further control a reflectance ratio of the first and second electrochromic elements.

12. The drive control circuit as defined in claim 11 further comprising at least one sensor for sensing glare, wherein the controller controls the reflectance ratio as a function of the sensed glare.

13. The drive control circuit as defined in claim 10, wherein the first and second shunts each comprise a shunt transistor.

14. A drive control circuit for controlling an electrochromic element, said drive control circuit comprising:
an input for receiving an input voltage;
a first resistive path coupled to the input for providing a first discrete amount of current to an electrochromic element;
a second resistive path coupled to the input for supplying a second discrete amount of current to the electrochromic element;
a current selector for selecting one of the first and second resistive paths to supply the corresponding one of the first and second discrete amounts of current to drive the electrochromic element; and
an output for supplying the selected one of the first and second discrete amounts of current to the electrochromic element.

15. The drive control circuit as defined in claim 14, wherein the current selector comprises a controller.

16. The drive control circuit as defined in claim 14, wherein the first discrete amount of current is a drive current which enables the electrochromic element to darken at a first rate, and the second discrete amount of current is a boost current which enables the electrochromic element to darken at a second faster rate.

17. The drive control circuit as defined in claim 16, wherein the boost current is controlled as a function of expected temperature.

18. The drive control circuit as defined in claim 17, wherein the expected temperature is determined based on a thermal model of the drive circuit.

19. The drive control circuit as defined in claim 14, wherein the current selector further selects both of the first and second resistive paths to generate a third greater discrete amount of current to drive the electrochromic element.

20. A control circuit for controlling an electrochromic element, said control circuit comprising:
an integrated circuit chip; and
a drive circuitry substantially formed in the integrated circuit chip for driving an electrochromic element, said drive circuitry comprising a current control circuit configured to supply current to an electrochromic element, wherein said current control circuit comprises a shunt device formed in the integrated circuit chip.

21. The control circuit as defined in claim 20 further comprising a processor formed in the integrated circuit chip.

22. The control circuit as defined in claim 20, wherein the integrated circuit chip comprises an application specific integrated circuit.

23. The control circuit as defined in claim 20, wherein the current control circuit is configured to provide at least first and second discrete amounts of current to be supplied to the electrochromic element.

24. The control circuit as defined in claim 23, wherein the current control circuit comprises a first resistor and a second resistor, wherein the first and second resistors are located separate from the integrated circuit chip.

25. The control circuit as defined in claim 24, wherein the drive circuitry comprises:
an input for receiving an input voltage;
a first current path including the first resistor coupled to the input for providing the first discrete amount of current;
a second current path including the second resistor coupled to the input for supplying the second discrete amount of current;
a switching circuitry for selecting one of the first and second current paths to select one of the first and second discrete amounts of current to drive the electrochromic element; and
an output for supplying the selected one of the first and second discrete amounts of current to the electrochromic element.

26. The control circuit as defined in claim 25, wherein the switching circuitry further selects both of the first and second current paths to select a third discrete amount of current to drive the electrochromic element.

27. The control circuit as defined in claim 20, wherein the shunt device is electrically coupled in parallel to the electrochromic element.

28. The control circuit as defined in claim 20, wherein the drive circuitry further comprises a digital-to-analog converter formed in the integrated circuit chip.

29. The control circuit as defined in claim 20 further comprising an undervoltage detect circuit formed in the integrated circuit.

30. The control circuit as defined in claim 20 further comprising an overvoltage detect circuit formed in the integrated circuit.

31. A control circuit for controlling an electrochromic element, said control circuit comprising:
an integrated circuit chip;

a processor formed in the integrated circuit chip; and
a drive circuitry substantially formed in the integrated circuit chip for driving an electrochromic element, said drive circuitry comprising a current control circuit including a shunt device and a first resistor configured to generate a current to be supplied to an electrochromic element, wherein the shunt device is formed in the integrated circuit chip and the first resistor is located separate from the integrated circuit chip.

32. The control circuit as defined in claim 31, wherein the integrated circuit chip comprises an application specific integrated circuit chip.

33. The control circuit as defined in claim 31, wherein the current control circuit further includes a second resistor, wherein the first and second resistors are configured to provide first and second discrete amounts of current to be supplied to the electrochromic element, and wherein the first and second resistors are located separate from the integrated circuit chip.

34. A drive control system for controlling first and second electrochromic elements, said control system comprising:
an input for receiving an input voltage;
a first shunt coupled in parallel with a first electrochromic element;
a second shunt coupled in parallel with a second electrochromic element;
a sensor for sensing glare; and
a controller for controlling a ratio of the reflectance of the first and second electrochromic elements, said controller controlling the ratio as a function of the sensed glare.

35. The drive control system as defined in claim 34, wherein the first electrochromic element comprises an inside mirror electrochromic element in a vehicle and the second electrochromic element comprises an outside mirror electrochromic element on the vehicle.

36. The drive control system as defined in claim 34, wherein the sensor comprises a first sensor for sensing ambient light and a second sensor for sensing impinging glare.

37. The drive control system as defined in claim 34, wherein the first and second electrochromic elements are connected in series.

38. The control system as defined in claim 34, wherein the controller further controls clearing of the first and second electrochromic elements by shorting the first and second electrochromic elements to ground when mirror dimming is not desired.

39. The drive control system as defined in claim 34 further comprising:
a first digital-to-analog converter for supplying a control signal to control the reflectance of the first electrochromic element; and
a second digital-to-analog converter for supplying a second control signal to control the reflectance of the second electrochromic element.

40. The drive control system as defined in claim 34, wherein said first and second shunts each comprise a feedback path.

41. A drive control circuit for driving first and second serially-connected electrochromic elements, said drive control circuit comprising:
an input for receiving a voltage;
a voltage regulating circuit for providing a predetermined voltage across the serially-connected electrochromic elements;
a first shunt connected across the first electrochromic element;
a feedback loop connected to the first shunt for controlling the voltage across the first electrochromic element;
a second shunt connected across the second electrochromic element;
a second feedback loop connected to the second shunt for controlling the voltage across the second electrochromic element;
a sensor for sensing glare; and
a controller for controlling a ratio of the reflectance of the first and second electrochromic elements, said controller controlling the ratio as a function of the sensed glare.

42. The drive control circuit as defined in claim 41, wherein the first electrochromic element comprises an inside electrochromic mirror in a vehicle, and the second electrochromic element comprises an outside electrochromic mirror on the vehicle.

43. The drive control circuit as defined in claim 41, wherein the first and second shunts each comprise a shunt transistor.

44. The drive control circuit as defined in claim 41, wherein the controller further controls clearing of the first and second electrochromic elements by shorting the first and second electrochromic elements to ground when mirror dimming is not desired.

45. An application specific integrated circuit for individually controlling the reflectivity of a plurality of series connected electrochromic elements independent of one another, comprising: a drive circuitry substantially formed in an integrated circuit chip for driving an electrochromic element, said drive circuitry comprising a current control circuit configured to supply current to an electrochromic element, said application specific integrated circuit further comprising an electrochromic drive input, responsive to a first input signal, for provocation of a first discrete amount of current.

46. The application specific integrated circuit as defined in claim 45 further comprising an electrochromic boost input, responsive to a second input signal, for provocation of a second discrete amount of current.

47. The application specific integrated circuit as defined in claim 46 further comprising a controller for generating said second input signal.

48. The application specific integrated circuit as defined in claim 45 further comprising a controller for generating said first input signal.

49. A method of controlling an electrochromic element, said method comprising the steps of:
receiving an input voltage;
generating a first discrete amount of current;
controlling a current regulator to change the first discrete amount of current to a second discrete amount of current; and
supplying a selected one of the first and second discrete amounts of current to an electrochromic element.

50. The method as defined in claim 49 further comprising the steps of generating the first discrete amount of current by applying the input voltage to a first resistance path and generating a second discrete amount of current by applying the input voltage to a second resistance path.

51. The method as defined in claim 50 further comprising the step of selectively switching to one of the first and second resistance paths.

52. The method as defined in claim 49, wherein the step of changing the first discrete amount of current to a second discrete amount of current enables the electrochromic element to darken at a faster rate.

53. The method as defined in claim 49 further comprising the step of shunting current to the electrochromic element to maintain a predetermined voltage potential input to the electrochromic element.

54. The method as defined in claim 49 further comprising the steps of:
   shunting current supplied to first and second electrochromic elements;
   sensing glare; and
   controlling a reflectance ratio of the first and second electrochromic elements as a function of the sensed glare.

55. A method of controlling an electrochromic element, said method comprising the steps of:
   receiving an input voltage;
   generating a discrete amount of boost current for darkening an electrochromic element;
   monitoring a boost time period; and
   controlling a current regulator to reduce the discrete amount of boost current to a lesser discrete amount of drive current when the monitored boost time period expires.

56. The method as defined in claim 55 further comprising the step of determining the boost time period as a function of expected temperature.

57. The method as defined in claim 56 further comprising the step of determining expected temperature as a function of a thermal model of the drive circuit.

58. The method as defined in claim 55, wherein the step of controlling the current regulator to reduce the discrete amount of boost current to a lesser discrete amount of drive current comprises switching out a resistor so that the drive current bypasses the resistor.

59. A method of controlling first and second serially-connected electrochromic elements, said method comprising the steps of:
   receiving an input voltage;
   regulating the input voltage to provide a predetermined voltage across the serially-connected electrochromic elements;
   shunting current around the first electrochromic element with a first shunt;
   shunting current around the second electrochromic element with a second shunt;
   sensing glare; and
   controlling a ratio of the reflectance of the first and second electrochromic elements as a function of the sensed glare by controlling the first and second shunts.

60. The method as defined in claim 59 further comprising the step of clearing the first and second electrochromic elements by shorting the first and second electrochromic elements to ground as a function of the sensed glare.

\* \* \* \* \*

UNITED STATES PATENT AND TRADEMARK OFFICE
CERTIFICATE OF CORRECTION

| | |
|---|---|
| PATENT NO. | : 7,215,318 B2 |
| APPLICATION NO. | : 10/178480 |
| DATED | : May 8, 2007 |
| INVENTOR(S) | : Robert R. Turnbull et al. |

Page 1 of 1

It is certified that error appears in the above-identified patent and that said Letters Patent is hereby corrected as shown below:

Column 16, claim 47, line 44;
　"46" should be --45--.

Column 16, claim 47, line 45;
　"second" should be --first--.

Column 16, claim 48, line 47;
　"45" should be --46--.

Column 16, claim 48, line 48;
　"first" should be --second--.

Signed and Sealed this

Tenth Day of July, 2007

JON W. DUDAS
*Director of the United States Patent and Trademark Office*